United States Patent [19]

Pepe

[11] Patent Number: 4,976,599
[45] Date of Patent: Dec. 11, 1990

[54] APPARATUS FOR EXTRUDING A SHEATH OF SYNTHETIC MATERIAL AROUND A CONDUCTOR AND FOR CHANGING THE COLOR OF SAME

[75] Inventor: David Pepe, Meriden, Conn.

[73] Assignee: Davis Electric Wallingford Corporation, Wallingford, Conn.

[21] Appl. No.: 359,906

[22] Filed: Jun. 1, 1989

[51] Int. Cl.$^5$ .................. B29C 47/04; B29C 47/10
[52] U.S. Cl. .................. 425/131.1; 264/174; 425/133.1; 425/185; 425/382.3; 425/462
[58] Field of Search .................. 425/130, 131.1, 132, 425/133.1, 185, 382.3, 182, 462; 264/171, 245, 174, 75, 211.23

[56] References Cited

U.S. PATENT DOCUMENTS

| | | | |
|---|---|---|---|
| 3,247,039 | 4/1966 | Schultheiss | 264/171 |
| 3,809,519 | 5/1974 | Garner | 425/132 |
| 4,504,511 | 3/1985 | Binley | 425/382.3 |
| 4,761,129 | 8/1988 | Aste et al. | 425/382.3 |
| 4,832,960 | 5/1989 | Compagnon | 425/132 |

FOREIGN PATENT DOCUMENTS 1222656  9/1960  Fed. Rep. of Germany .

OTHER PUBLICATIONS

Texaco Manual Copyright 1954 by the Texas Company, p. 10.

Primary Examiner—Jay H. Woo
Assistant Examiner—James P. Mackey
Attorney, Agent, or Firm—Pennie & Edmonds

[57] ABSTRACT

An apparatus is provided for directing at least two flows of synthetic material from an extruder to an extruder cross-head for coating a conductor wire with two layers of insulating material and to readily reverse the colors of the layers. The apparatus includes at least two separate tubes which communicate with an extruder outlet for directing synthetic material from the extruder outlet to the respective tube. The tubes communicate at their outlet ends with respective inlet openings of the extruder head. A rotator block is arranged to selectively and quickly reverse the positions of the outlet openings of the tubes with respect to the inlet openings of the extruder head such that after reversal, the outlet opening of each tube communicates with the other inlet opening of the cross-head. Thus, the capability to reverse the flows of insulating material is provided thereby making it possible to reverse the colors of the inner and outer layers of insulating material on the conductor wire.

21 Claims, 6 Drawing Sheets

APPARATUS FOR EXTRUDING A SHEATH OF SYNTHETIC MATERIAL AROUND A CONDUCTOR AND FOR CHANGING THE COLOR OF SAME

TECHNICAL FIELD

The present invention relates to a device for changing color during the process of continuously extruding a sheath of synthetic material around a conductor wire. In particular, the invention relates to an apparatus which is capable of selectively changing the flows of synthetic material exiting an extruder and directed to an extruder head for coating the conductor wire.

BACKGROUND ART

Insulated electrical wires and cables are generally supplied with an outer sheath - or coating - of insulating material. The insulating material is usually a synthetic plastic material which can be conveniently extruded about the conductor wire and is generally available in up to about eleven colors. Thus, producing such insulated wire either for a customer directly or for inventory or sale, the objective is sometimes directed toward production of great lengths of wire in different colors. At other times, it may be required to produce only lengths of wire to meet customers needs and color requirements. Thus, flexibility in changing colors is desirable.

End users often require manufacturers to produce relatively small amounts of wire in a selected number of colors. These requirements present relatively difficult problems of production of wire according to need without incurring excessive waste due to overproduction of a particular color or changes in customer needs.

It is therefore desirable to have the capability to produce wire according to customer needs and to thereby avoid the necessity to supply customers by overstocking. This capability, however, has presented practical problems in the past whereby coating of specific lengths of wire in different colors has necessitated shutting down the system and purging the lines, with the result that enormous amounts of product was lost due to waste caused by such system shutdowns.

One proposal to avoid stopping production was to change the extruder with the synthetic material of the new color while continuing to extrude material of the old color. This proposal was believed to produce excessive amounts of waste due to the fact that changing from one color to another required discharging the entire system with the first color.

Another proposal is disclosed in German Pat. Publication No. DE 1,222,656 whereby a system of two-way, two distributors and four conduits are used to coat a wire with two layers of plastic; an inner layer of one color and an outer layer of another color. Reversing the colors required stopping production and ultimately purging the conduits which were discontinued after the reversal. This purging process became difficult after the material solidified in the lines.

Another proposal is disclosed in U.S. Pat. No. 4,761,129 to Aste et al. whereby a system for extruding a sheath of plastic around a conductor utilizes a distributor with two pairs of channels; a first pair for directing plastic material from an extruder to an extruder head; and a second pair of inverted channels for changing the flows of plastic such that the material previously forming the inner layer now forms the outer layer, and vice versa. This system, however, requires intermediate purging of lines to remove plastic material remaining in the channels not used after reversal.

I have invented an apparatus which avoids the disadvantages of the prior art systems. According to my invention, the conductor is laminated with dual layers of insulating material; an inner layer of one color, and an outer layer of another color. The layers are quickly and conveniently changed by my apparatus with the result that a minimal amount of wire having a hybrid coating is produced thereby resulting in a minimum loss of coated conductor.

SUMMARY OF THE INVENTION

An apparatus is disclosed for directing at least two flows of synthetic material from extruder means to an extruder head which comprises means defining at least two separate conduits, each conduit communicating with an extruder outlet for directing synthetic material from the extruder outlet to the respective conduit, the conduits communicating at their outlet ends with respective inlet openings of the extruder head, and means to selectively changed the positions of the outlet openings of the conduits with respect to the inlet openings of the extruder head such that after changing, the outlet opening of each conduit communicates with another inlet opening of the cross head.

In the preferred embodiment, the apparatus for directing at least two flows of synthetic material from extruder means to an extruder head comprises means defining at least two separate conduits, a first conduit communicating with a first extruder outlet opening at one end and at the other end with a first extruder head inlet opening, and a second conduit communicating with a second extruder outlet opening at one end and at the other end with a second extruder head inlet opening, and means to selectively change the respective communication of the outlet openings of the first and second conduits and the respective extruder head inlet openings.

Preferably, when the apparatus is changed, after reversal, the outlet opening of the first conduit communicates with the second extruder head inlet opening and the outlet opening of the second conduit communicates with the first extruder head inlet opening. Each conduit is preferably defined by a tubular member communicating at one end with the extruder and at the other end with the extruder head. Also, each tubular member is preferably supported at its outlet end by rotatable support means capable of rotating at least a partial circle to change the relative positions of the outlet ends of the tubular members. The rotatable support means is a rotatable support member in the preferred embodiment.

The rotatable support member is preferably in the form of a rotator block which is bearing supported by bearing means for rotation over at least a part of a circle, and means is provided to selectively rotate the rotator block. The means to rotate the rotator block is preferably comprised of a pair of mating rack and pinion assemblies contacting the rotator block and arranged to selectively cause rotation of the rotator block at least up to about 180 degrees. Each tubular member is supported and selectively maintained in a predetermined position between the rotator block at the outlet ends and fixed support means at the inlet ends thereof.

The fixed support means of the apparatus includes at the inlet end of each tubular member, a fixed support member defining a generally concave surface portion and the inlet end of each tubular member has a correspondingly convex configuration such that the inlet ends of the tubular members are seated within the concave surface defined by portions of the fixed support member. Further, the outlet end of each tubular member has a convex configuration adapted to be nestled within a correspondingly concave surface portion defined by the rotator block. Each concave surface support portion is preferably defined by a brass cup. Resilient means is positioned to provide compressive forces between the rotator block and the tubular members to retain the members in position between the fixed support member at the material inlet end of the tubular members and the rotator block at the material outlet end of the tubular members.

The tubular members are capable of sliding movement at the interface between the respective inlet ends thereof and the fixed support and the respective outlet ends thereof and the rotator block. Further, the rotator block is comprised of at least two sections, a first section mounted for rotation and a second section mounted adjacent the rotatable section for movement toward and away from the tubular members. The resilient means is positioned between at least one of the sections of the rotator block to resiliently urge the other section toward the tubular members to retain the tubular members in compressed condition and thereby retain the respective inlet and outlet openings thereof in sealed relation with the corresponding openings of the fixed support member at the material inlet end and the rotator block at the material outlet end, respectively. Further, the rotator block defines outlet openings which communicate with the inlet openings of the extruder head for directing synthetic plastic material to the extruder head.

In the preferred embodiment, the rotator block is comprised of a portion having an outer generally circular configuration defining a plurality of teeth therearound, which teeth are configured to mesh with a pair of correspondingly configured racks, each rack having a plurality of teeth which mesh therewith, and each rack being positioned on an opposite side of the rotator block, the rotator block being thereby rotated when the racks are moved in opposite directions. Each rack is moved in a direction opposite the other rack by a pneumatic cylinder to rotate the generally circular toothed portion which forms a corresponding mating pinion gear positioned in engagement therewith.

The invention also relates to an apparatus for extruding a sheath of synthetic material around a conductor or the like which comprises an extruder head provided with at least two inlet conduits for synthetic material respectively communicating with at least two orifices traversed by the conductor for extruding around the conductor a sheath formed of two layers of the material, an extruder for providing at least two flows of synthetic material, distributing means for selectively directing the two flows of synthetic material from the extruder to the extruder head and for selectively changing the flows entering the extruder head. The distributing means comprises a frame, at least two elongated tubular members communicating the extruder of synthetic material with the extruder head, the extruder having one synthetic material outlet opening communicating with one of the members and the synthetic material outlet opening communicating with the other of the members, the tubular members respectively communicating with corresponding inlet openings of the extruder head. Rotatable means supports the tubular members at their outlet ends, and means is provided to rotate the rotatable means to change the respective positions of the tubular members at their outlet ends. After such changing, each tubular member communicates at its outlet end with a different inlet opening of the extruder head.

BRIEF DESCRIPTION OF THE DRAWINGS

Preferred embodiments of the invention will be described hereinbelow with reference to the drawings wherein.

DETAILED DESCRIPTION OF THE PREFERRED EMBODIMENTS

Figure 1:
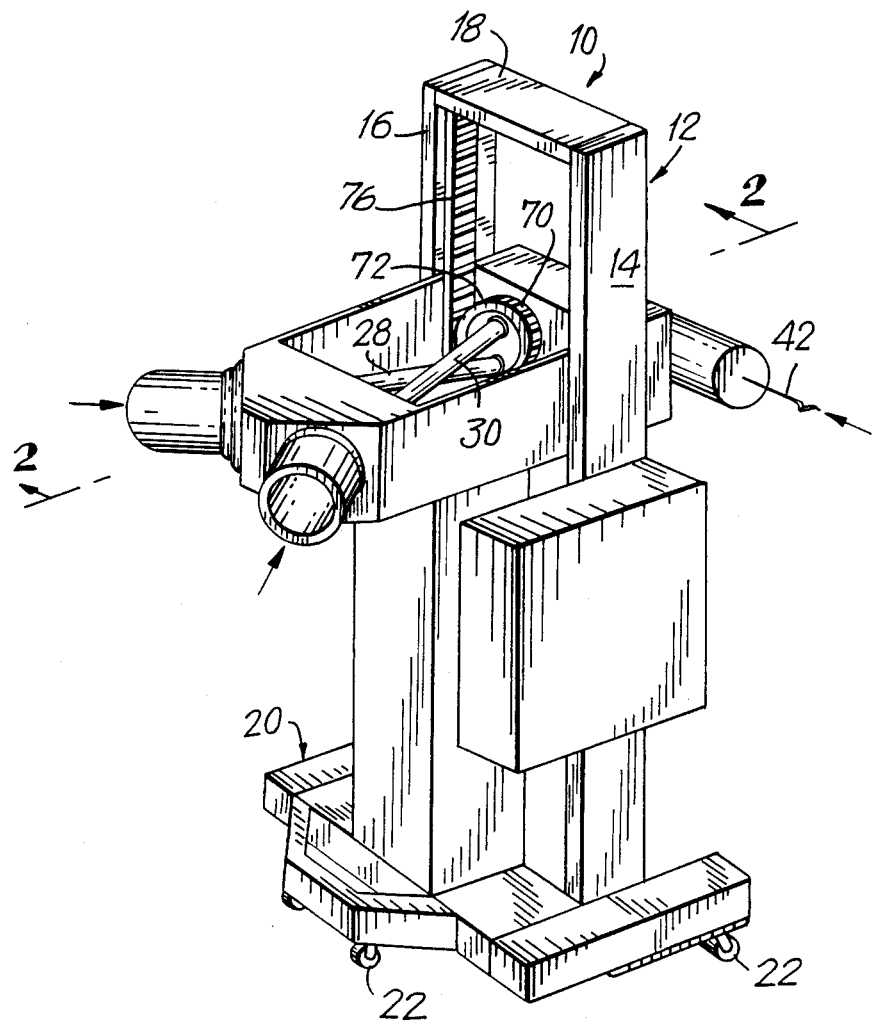
FIG. 1 is a perspective view of an apparatus constructed according to my invention.

Referring initially to FIG. 1 the apparatus according to my invention is illustrated in perspective. The apparatus 10 is constructed of frame 12 having upright members 14 and 16 and horizontal cross member 18. Base 20 is supported on casters 22 for ease of movement of the apparatus to and away from a work station.

Figure 3:
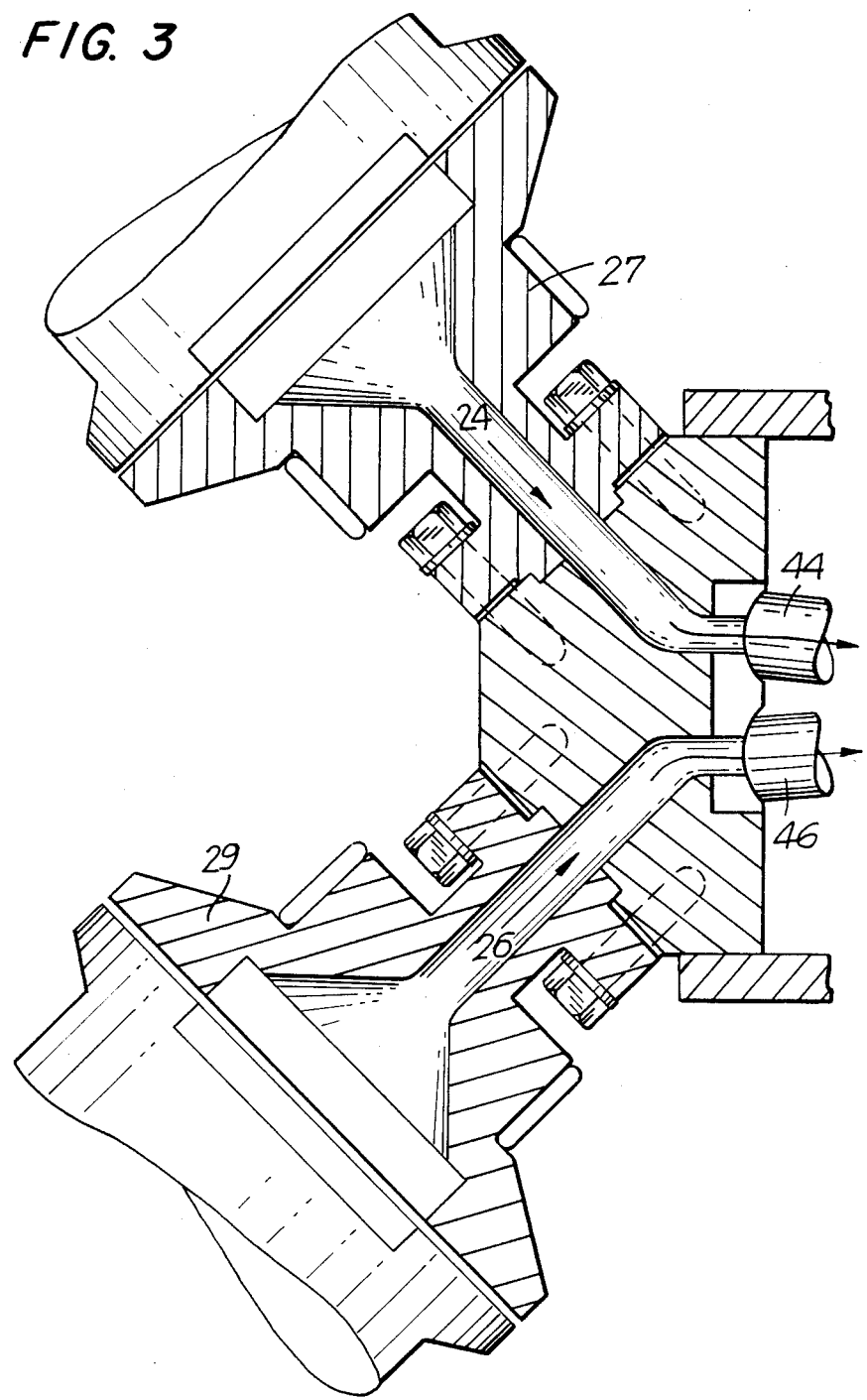
FIG. 3 is a partial cross-sectional view taken along lines 3—3 of FIG. 2.
Figure 4:
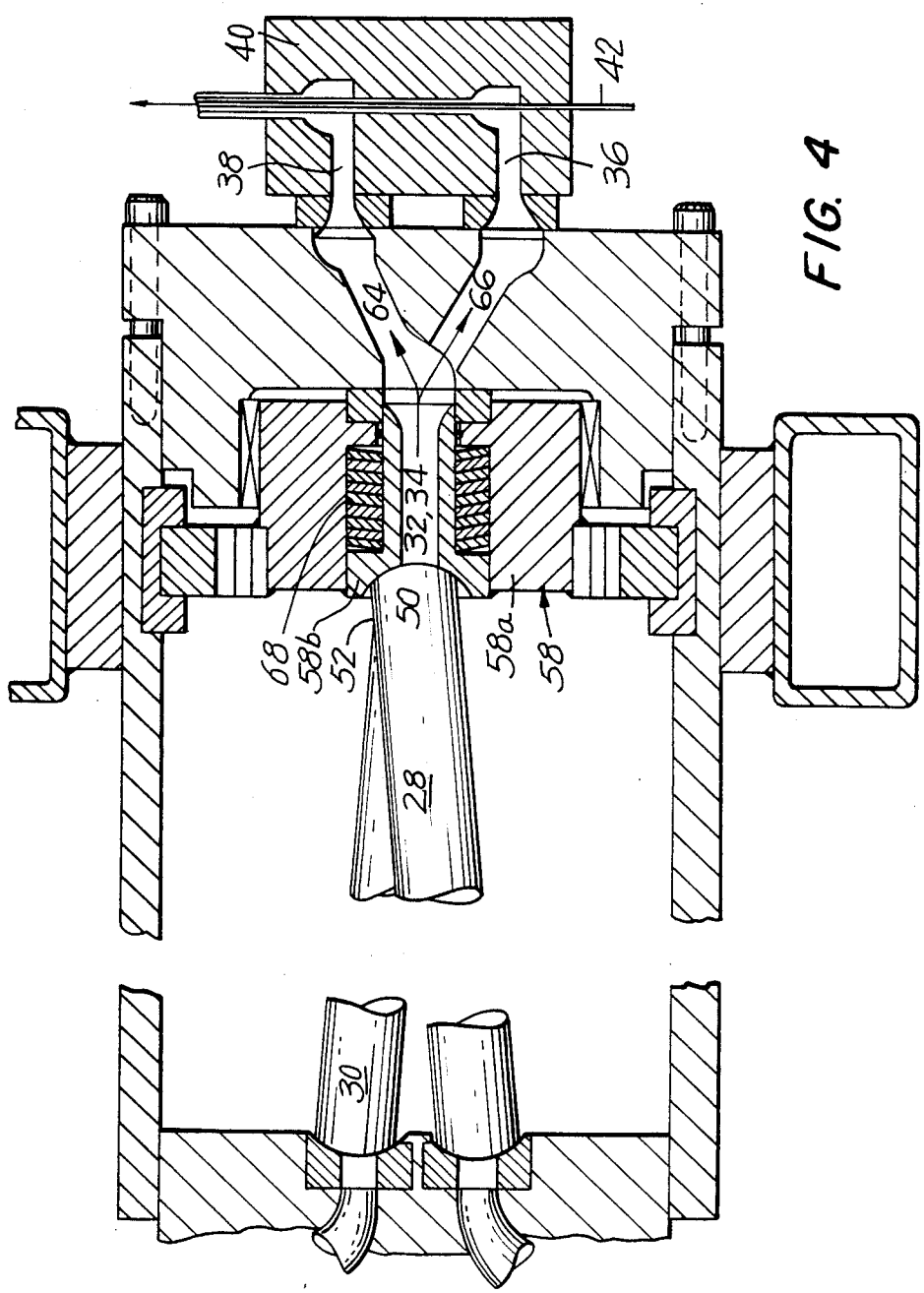
FIG. 4 is a partial cross-sectional view, partially broken away, taken along lines 4—4 of FIG. 2.

The extruder outlet heads 27 and 29 are shown in FIG. 3 in respective communication with inlet ends 44 and 46 of tubular members 30 and 28, respectively. The material flows 24 and 26 of the extruder actually communicate with material inlet ends of the tubular members 28 and 30. The tubular members 28 and 30 communicate at their outlet ends with synthetic material flow conduits 32 and 34 which communicate with corresponding conduits 36 and 38 formed within extruder head 40 which extrudes separate layers of material around conductor 42 as shown in FIG. 4. Where it is desired to provide a plastic extrusion of a given color as the outer coating of the conductor, the inner material may be of a different color than the outer, since the outer color will be the one which is seen by the user. When the outlet end portions of tubular members 28 and 30 are changed as will be described, the material which previously formed the inner layer now forms the outer layer and vice versa.

Figure 2:
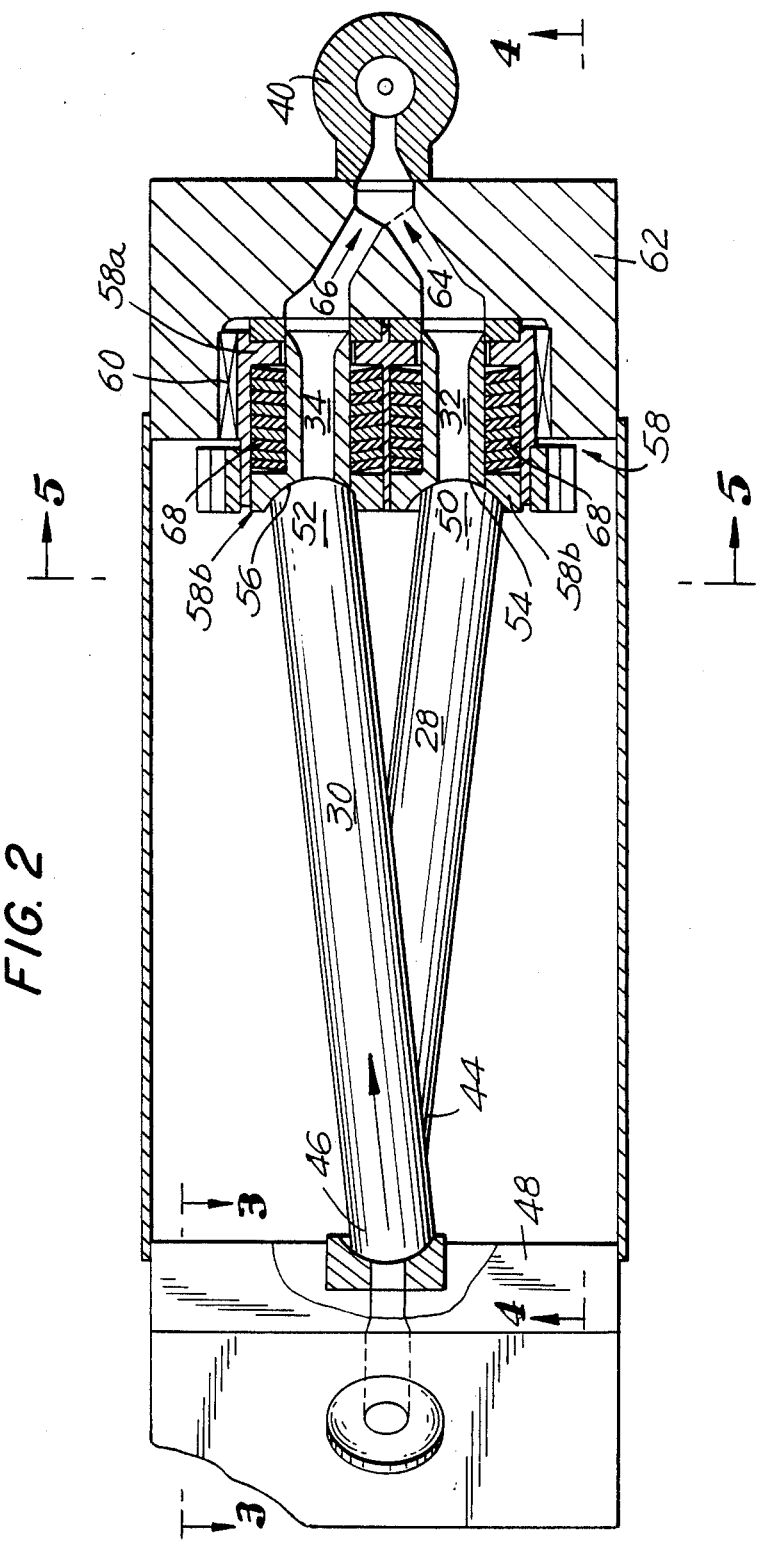
FIG. 2 is a partial cross-sectional elevational view taken along lines 2—2 of FIG. 1.

Referring now to FIG. 2, the tubular members 28 and 30 are maintained in communication with their respective material inlets and the material outlets in a unique fashion as will be described. The tubular members each have a convex configuration at the material inlet ends 44 and 46 and are nestled within correspondingly shaped concave surfaces formed in fixed support block 48 as shown. At the material outlet ends 50 and 52 the tubular members 28 and 30 are also similarly configured as convex shapes as shown, and are nestled within correspondingly configured concave surfaces, 54 and 56, respectively, formed within rotator block 58 which is rotatably supported on bearings 60 within end support 62 which in turn defines material flow paths 64 and 66 which communicate with extruder head 40 as shown.

The rotator block 58 is constructed of two sections, an outer section 58a and inner cups 58b, preferably of hardened steel, which are slidable relative to outer section 58a in the axial direction. The objective is to preload section 58b of rotator block 58 against the material outlet ends 50 and 52 of tubular members 28 and 30 in order to maintain a leak-proof seal. To accomplish this objective a plurality of spring washers, generally well known as "Belleville Spring Washers" 68 are positioned within the space defined between the slidable section 58b and the fixed section 58a of rotator block 58 to provide a suitable preload force against the end portions 50 and 52 of tubular members 28 and 30. The spring washers may be arranged in any desirable arrangement whereby the desired "Spring rate" (a measure of the forces applied per unit deflection) is obtained. Thus, upon providing the requisite force, the seal is maintained between the inlet ends of the tubular members and the fixed support block 48 at the inlet ends, and the outlet ends of the tubular members and the rotatable support block 58.

Referring now once again to FIG. 2, the synthetic plastic material flows from the extruder into the tubular members 28 and 30 and thereafter into flow paths 32 and 34 defined within the slidable section 58a of rotatable support block 58. After passing the relatively seal-tight interface between the outlet ends 50 and 52 of the tubular members 28 and 30, the material flows into the extruder head 40, providing an inner layer of one color (represented by flow path 36, as shown in FIG. 4), and an outer layer of another color (represented by flow path 38, as shown in FIG. 4).

After coating a predetermined footage of conductor 42 (as required either by the customer or by inventory requirements) the flow paths to the extruder head 40 are then suitably changed by rotating the rotator block 58 a full 180 degrees in the manner which will now be described. Thus, the material previously forming the inner layer, now forms the outer layer and the material previously forming the outer layer now forms the inner layer of the conductor.

Figure 5:
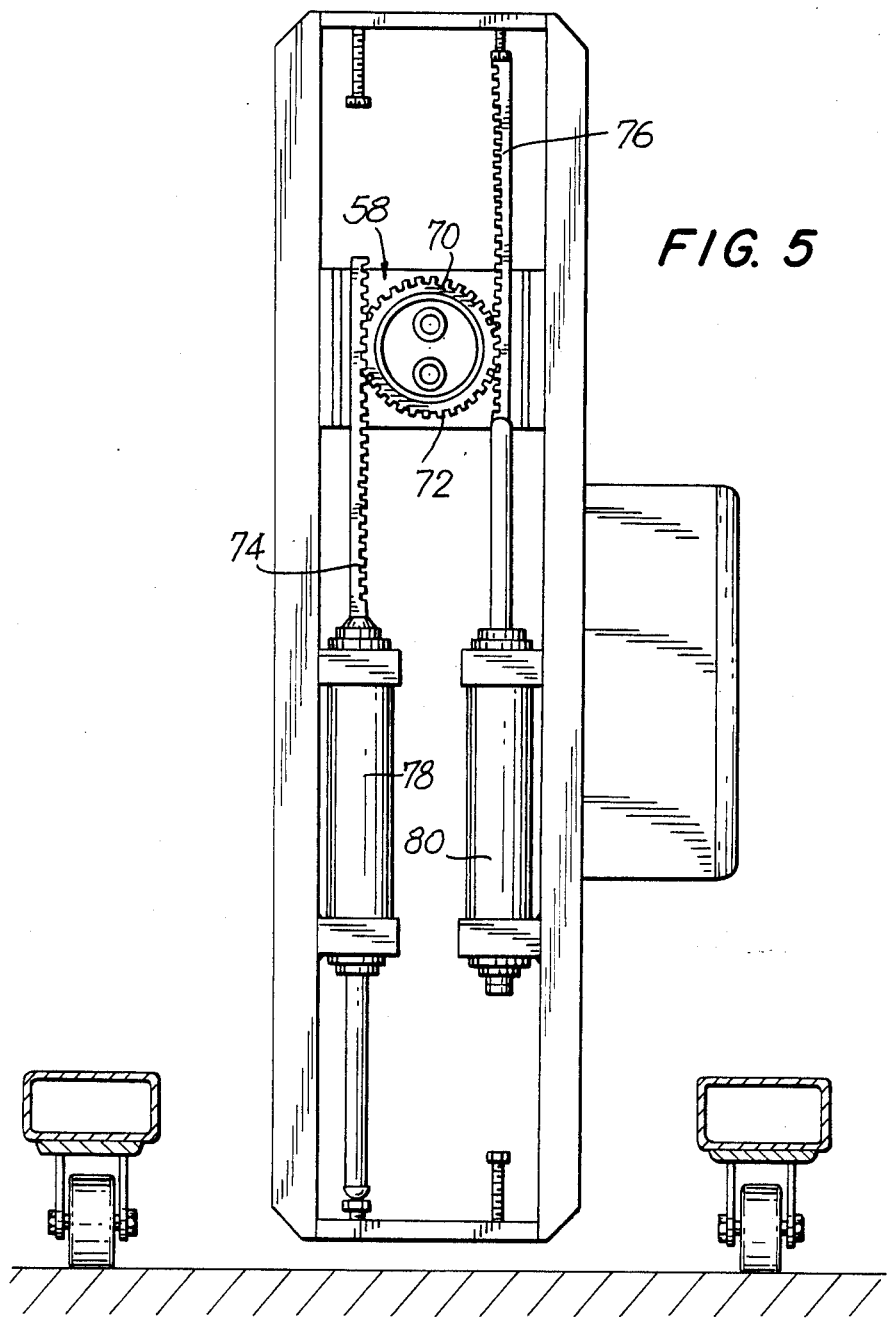
FIG. 5 is a partial cross-sectional elevational view taken along lines 5—5 of FIG. 2.
Figure 6:
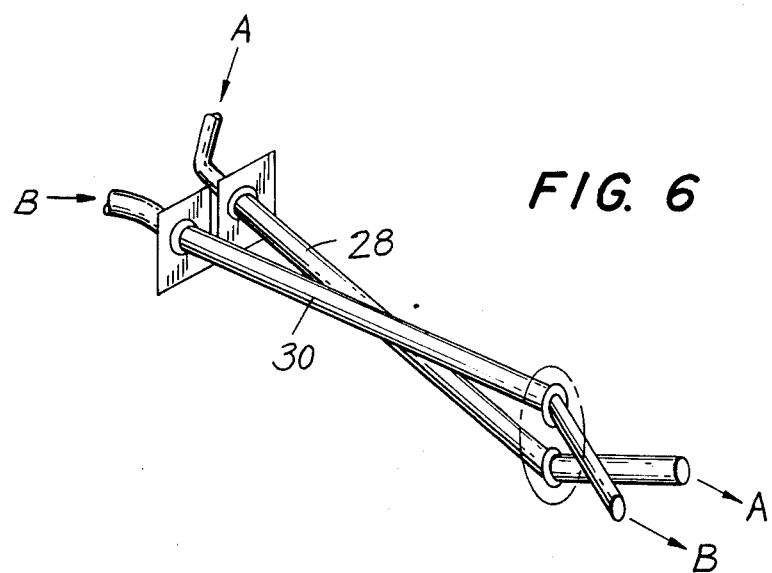
FIG. 6 is a schematic view illustrating a first position for the apparatus of my invention wherein a first path of flow for synthetic material is defined.
Figure 7:
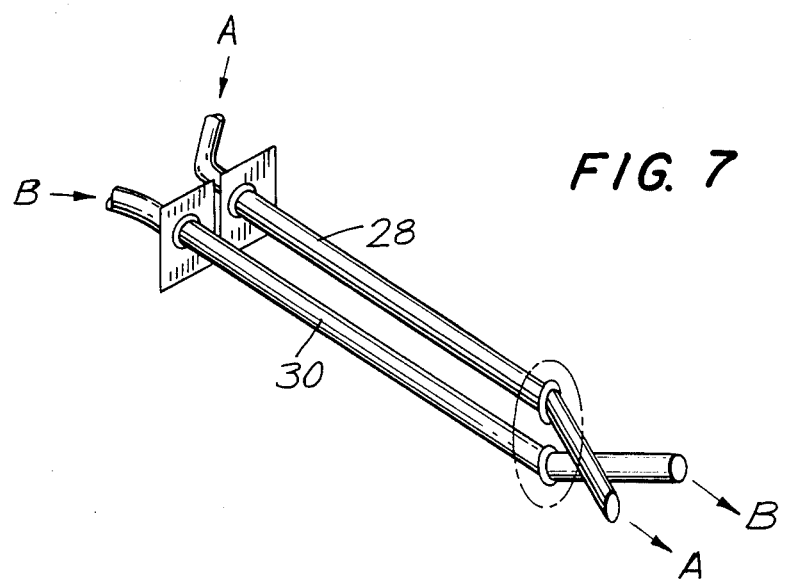
FIG. 7 is a schematic view illustrating a second position for the apparatus of my invention wherein a second path of flow for synthetic material is defined.

Referring now to FIG. 5, rotator block 58 includes an outer pinion gear 70 having teeth 72 which define its outer configuration, and a plurality of correspondingly toothed racks 74 and 76 are provided in meshed engagement with the gear 70, with each rack respectively connected to an appropriate hydraulic cylinder 78 and 80. Alternatively, a system of pneumatic cylinders can be utilized. Thus, in order to rotate the pinion gear 70 counterclockwise as shown in FIG. 5, hydraulic cylinder 80 is actuated to cause rack 76 to become displaced upwardly and hydraulic cylinder 78 is actuated to cause rack 74 to become displaced downwardly. Reversal of rotation of pinion gear 70 is achieved by correspondingly opposite movements of the air cylinders and racks. The total rotational movement of the pinion gear 70 is 180 degrees counterclockwise and clockwise, whereby the respective positions of the outlet ends of tubular members 28 and 30 are changed. Thus, in the position shown in FIG. 6, the material entering tubular member 28 at the inlet end exits as flow A entering the extruder head 40 at A and the material entering tubular member 30 exits as flow B. After changing the output ends of the tubular members as described, the material flow A through tubular member 28 now exits tubular member 28 and enters extruder head 40 as flow A and the material flowing through tubular member 30 now exits the tubular member and enters the extruder head as flow B. Thus, a color change of a plastic coated conductor can be made within seconds by simply rotating the pinion section of rotator block 58 as shown, whereby the respective inner and outer coatings are now changed. Thus, by such quick changing, i.e. $\frac{1}{4}$ to $\frac{1}{3}$ second, two separate supplies of coated conductors are produced, each being of a different color. Moreover, by changing the input materials fed into the extruder on a continuous basis, conductors of additional colors can be produced. Further, by maintaining the apparatus at a predetermined temperature, i.e. by heating means such as heating cartridges, infra red heaters, etc., the material in all lines will flow properly.

There is no need to purge or clean the conduits since, after changing, a small length of product, i.e. about two inches, will merely be coated with material formed of both colors which will have become mixed. If desired, this "interim" product can simply be cut from the supply and discarded. After this small amount of "mixed coated" product is produced, the color of each coating will become stabilized and the conductor will be coated with material of a single color. In addition, there is no need to stop the process for the purpose of changing color or for purging the lines.

In operation a conductor 42 may be coated with dual plastic insulating coatings on a continuous basis. For example, an inner coating of white synthetic plastic insulating material can be fed into tubular member 28 and black synthetic plastic material can be fed into tubular member 30. The final coated conductor will be white and will have an inner coating of black. After a predetermined footage of conductor has been produced, the rotator block will be rotated 180 degrees as described, with the result that the final product will now be black. However, before changing color completely, there will be some interim flow of material where residual white material remaining in the conduits 36 and 38, for example, will affect the new color such that a relatively minor amount of footage will have an outer coating comprised of a mixture of black and white material. In this case, the mixed or "hybrid" portion will simply be discarded.

I claim:

1. Apparatus for directing at least two flows of synthetic material from extruder means to an extruder head, which comprises:
    means defining at least two separate conduits, each said conduit being movable between first and second positions relative to said extruder head, each said conduit further having an inlet end and an outlet end, each said conduit communicating at its inlet end with a corresponding extruder outlet opening and at its outlet end with a corresponding extruder head inlet opening; and
    means for changing the position of each outlet end of said conduits for communication with a different extruder head inlet opening by moving said conduits from said first position to said second position.

2. The apparatus according to claim 1 wherein each conduit comprises an elongated tubular member.

3. The apparatus according to claim 2 wherein said changing means is a rotator block member supported by bearing means, further comprising means for rotating said rotator block member over a predetermined angle.

4. The apparatus according to claim 3 wherein said rotator block member includes a separate flow path in communication with each said tubular member for forming the outlet end of each conduit.

5. The apparatus according to claim 4 wherein said rotating means includes means for selectively rotating said rotator block member in clockwise or counterclockwise directions.

6. The apparatus according to claim 5 wherein said means for selectively rotating said rotator block member comprises a rack and pinion assembly and pneumatic drive means for driving said rack and pinion assembly, wherein two racks are positioned on opposite sides of a pinion, said pinion being attached to said rotator block member such that said rotator block member is rotated when said racks are moved in opposite directions.

7. The apparatus according to claim 3 further comprising fixed support means at the inlet ends of each tubular member, said fixed support means comprising a generally concave surface portion, wherein said inlet end of each tubular member has a correspondingly convex configuration such that the inlet ends of said tubular members are sealed within the concave surface portions of said fixed support means.

8. The apparatus according to claim 7 wherein said outlet end of each said tubular member has a convex configuration adapted to be nestled within a correspondingly concave surface portion of said rotator block member.

9. The apparatus according to claim 8 wherein said concave surface portions of said rotator block member and said fixed support means comprise steel cups.

10. The apparatus according to claim 9 wherein said rotator block member is comprised of at least two sections, a first section mounted for rotation and a second section mounted adjacent said first section for movement toward and away from said tubular members.

11. The apparatus according to claim 10 wherein said tubular members are capable of sliding movement at their respective outlet ends and resilient means is positioned between said first and second sections of said rotator block member to provide compressive forces between said rotator block member and said tubular members to retain said tubular members in sealed relation with corresponding openings in said fixed support means and said rotator block member, respectively communicating with the extruder outlet openings and the extruder head inlet openings, respectively.

12. Apparatus for directing two flows of synthetic material from extruder means to an extruder head for extruding a sheath of synthetic material around a conductor, which comprises:

first and second conduits, each said conduit being moveable between first and second positions relative to said extruder head, each conduit further having an inlet end and an outlet end, each said conduit communicating at its inlet end with a corresponding extruder outlet, and each said conduit communicating at its outlet end with a corresponding extruder head inlet opening;

means for changing the position of each outlet end of said conduits for communication with a different extruder head inlet opening by moving said conduits from said first position to said second position, said changing means comprising a rotator block member which is supported by bearing means for supporting said rotator block member for rotation over at least a part of a circle; and means for rotating said rotator block member over a predetermined angle thus changing the communication of said conduits with respect to said extruder head inlet openings.

13. The apparatus according to claim 12 wherein each said conduit comprises an elongated tubular member.

14. The apparatus according to claim 13 wherein said rotator block member includes a separate flow path in communication with each said tubular member for forming the outlet end of each conduit.

15. The apparatus according to claim 12 wherein said rotating means includes means for selectively rotating said rotator block member in clockwise or counterclockwise directions.

16. The apparatus according to claim 15 wherein said means to selectively rotate said rotator block member comprises a rack and pinion assembly and pneumatic drive means for driving said rack and pinion assembly, wherein two racks are positioned on opposite sides of a pinion, said pinion being attached to said rotator block member such that said rotator block member is rotated when said racks are moved in opposite directions.

17. The apparatus according to claim 16 wherein said inlet ends of said tubular members are supported by a fixed support means which comprises a generally concave surface portion and said inlet ned of each said tubular member has a correspondingly convex configuration such that the inlet ends of said tubular members are sealed within the concave surface portion of said fixed support means; said outlet ends of said tubular member also having a convex configuration adapted to be nestled within a correspondingly concave surface portion of said rotator block member.

18. The apparatus according to claim 17 wherein said concave surface portions of said rotator block member and said fixed support means comprise steel cups.

19. The apparatus according to claim 18 wherein said rotator block member is comprised of at least two sections, a first section mounted for rotation and a second section mounted adjacent said first section for movement toward and away from said tubular members.

20. The apparatus according to claim 19 wherein said tubular members are capable of sliding movement at their outlet ends and resilient means is positioned between said first and second sections of said rotator block member to resiliently urge said second section toward said tubular members to retain said tubular members in compressed condition and thereby retain their respective inlet and outlet ends in sealed relation with corresponding openings in said fixed support means and said rotator block member, respectively communicating with the extruder outlet openings and the extruder heat inlet openings, respectively.

21. Apparatus for directing two flows of synthetic material from extruder means to an extruder head for extruding a sheath of synthetic material around a conductor, which comprises:

first and second conduits, each conduit being moveable between first and second positions relative to said extruder head, each conduit further having an inlet end and an outlet end, each said conduit communicating at its inlet ned with a corresponding extruder outlet, and each said conduit communicating at its outlet end with a corresponding extruder head inlet opening;

means for changing the position of each outlet end of said conduits for communication with a different extruder head inlet opening by moving said conduits from said first position to said second position, said changing means comprising a rotator block member which is supported by bearing means for supporting said rotator block member for rotation over at least a part of a circle; and means for selectively rotating said rotator block member over a predetermined angle thus changing the communication of said conduits with respect to said extruder head inlet openings, said selective rotating means comprising a rack and pinion assembly and pneumatic drive means for driving said rack and pinion assembly, wherein two racks are positioned on opposite sides of a pinion, said pinion being attached to said rotator block member such that said rotator block member is rotated when said racks are moved in opposite directions.

* * * * *